J. J. SULLIVAN.
PACKING RING.
APPLICATION FILED APR. 17, 1909.

1,022,341.

Patented Apr. 2, 1912.

Witnesses

Inventor
Jeremiah J. Sullivan
By
Attorneys

# UNITED STATES PATENT OFFICE.

JEREMIAH J. SULLIVAN, OF NEW DECATUR, ALABAMA, ASSIGNOR OF ONE-HALF TO HIMSELF, AND ONE-HALF TO JAMES J. McCARTHY, OF CHICAGO, ILLINOIS.

PACKING-RING.

1,022,341.

Specification of Letters Patent.

Patented Apr. 2, 1912.

Application filed April 17, 1909. Serial No. 490,499.

*To all whom it may concern:*

Be it known that I, JEREMIAH J. SULLIVAN, a citizen of the United States, residing at New Decatur, in the county of Morgan and State of Alabama, have invented certain new and useful Improvements in Packing-Rings, of which the following is a specification.

My invention relates to improvement in metallic packing for piston rod and similar devices primarily employing a series of split rings.

The object of my invention is to provide a packing ring and followers of such shape and relatively placed together to maintain parallelism at all times with the packing ring or rings maintained in a contracted condition, unaffected by the wear to which the parts are constantly subjected.

Another object of my invention is to provide a packing ring with tapering sides adapted to engage correspondingly beveled packing rings or follower rings upon each side.

The features of my invention are more fully set forth in the description of the accompanying drawings, forming a part of this specification, in which:—

Figure 1:
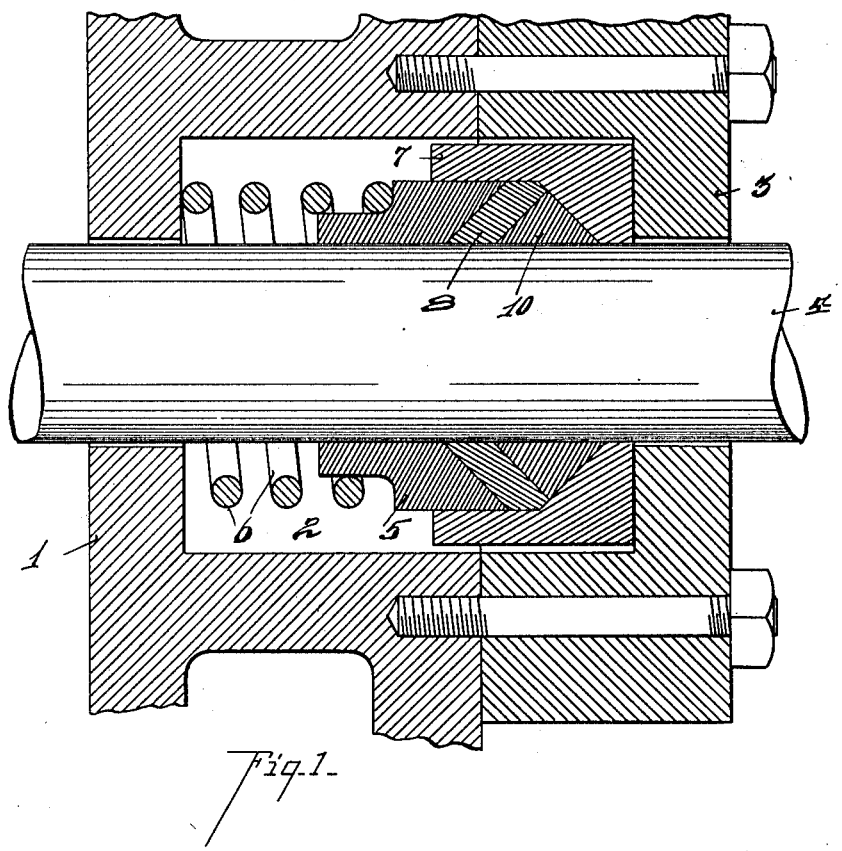
Figure 2:
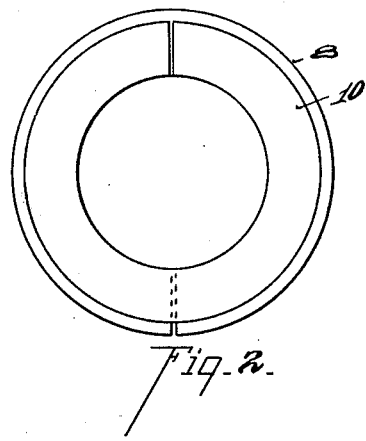
Figure 3:
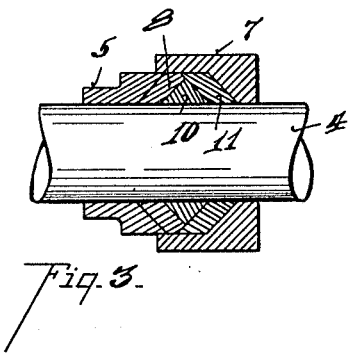

Figure 1 is a central vertical section of a piston rod with the packing parts applied in position. Fig. 2 is an end elevation of a packing ring and follower ring. Fig. 3 is a central vertical section through a modified form of packing.

1 represents a section of the cylinder head.

2 represents a stuffing-box.

3 represents a removable cap or gland for inclosing the packing within the stuffing-box.

4 represents a piston-rod.

5 represents a follower ring.

6 represents a coiled spring, one end of which seats against the wall of the stuffing-box, with the opposite end supported upon and seating against a shoulder of the follower ring 5.

7 represents a stationary cup ring for holding the packing in position.

The inner face of the ring 5 is beveled inward and forms a seat for the split packing ring 8. This packing ring 8 is provided with beveled faces parallel with each other, preferably on the same plane or inclined as the beveled face of the follower 5.

10 represents a conical split packing ring, the inner face of which seats against one face of the packing ring 8 with the opposite face seating against the inclined inner face of the cup ring 7. The rings 8 and 10 are preferably split and set so that the split portions do not aline with each other, thereby breaking or closing the joints against the escape of steam.

In the modification, shown in Fig. 3, the arrangement of packing rings and follower are similar or identical with that illustrated in Fig. 1 with the additional provision of a third split packing ring 11 provided with double beveled faces, one face seating against the conical ring 10 and a portion of the ring 8 with the opposite face seating against the cup ring 7.

It is obvious that various numbers or arrangements of packing rings may be employed without departing from the features of my invention, in which, the packing rings are provided with tapering sides in which one overlaps the other for breaking straight joints between the members.

The operation of the packing in forming tight joints around the piston rod is caused by the compression through the force of the spring 6, compressing the several members against each other and against the cup ring, the latter being maintained against the walls of the gland 3. The oppositely inclined beveled faces of the follower ring and cup ring with the intermediate packing rings, variously inclined relative to each other, preserve the parts in parallel relation and obviate the liability of abutting surfaces to wear unevenly.

Having described my invention, I claim:—

In a packing of the class described, a cup ring provided with an inner angular surface, a follower ring fitting within said cup ring, having an inclined end oppositely inclined from the angular surface of the cup ring, a shoulder formed annularly around said follower ring, providing a seat for a spring for maintaining said follower ring under tension within said cup ring, a conical split ring of lesser diameter than the bore of the cup ring seated against the angular surface of said cup ring, and a second split ring interposed between the angular surfaces of said conical ring and follower ring of equal diameter with the bore of the cup ring, with one peripheral edge angled to engage with the angular surface of said cup ring, whereby said rings maintain parallelism with cup and follower rings.

In testimony whereof, I have hereunto set my hand.

JEREMIAH J. SULLIVAN.

Witnesses:
F. A. BLOODWORTH,
OLIVER B. KAISER.

Copies of this patent may be obtained for five cents each, by addressing the "Commissioner of Patents, Washington, D. C."